Feb. 17, 1925.
C. E. TURNQUIST
1,526,399
COMBINED CALENDAR AND CHART
Filed Jan. 12, 1923  2 Sheets-Sheet 1
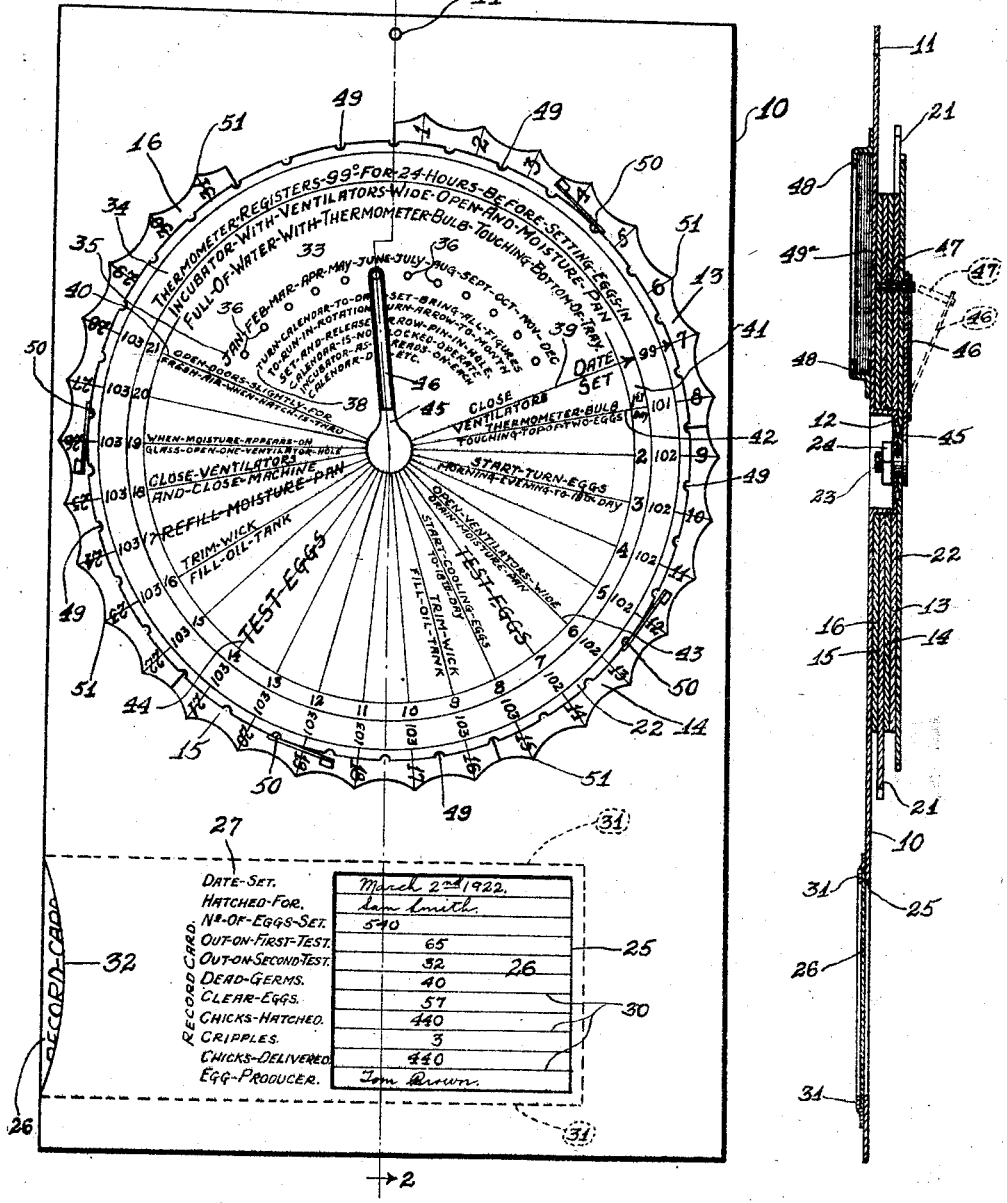
Inventor
CARL E. TURNQUIST.

Feb. 17, 1925. 1,526,399
C. E. TURNQUIST
COMBINED CALENDAR AND CHART
Filed Jan. 12, 1923 2 Sheets-Sheet 2
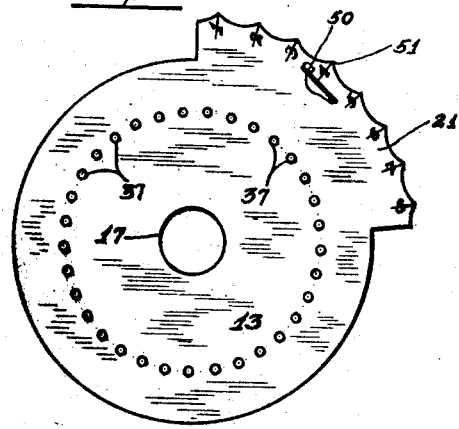
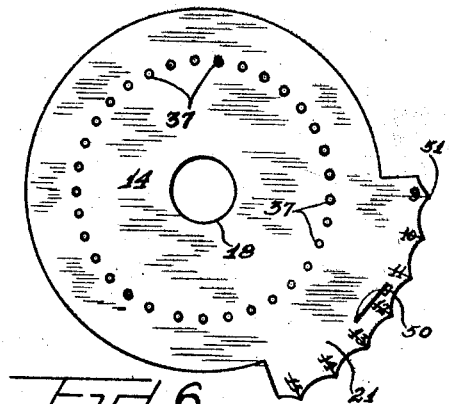
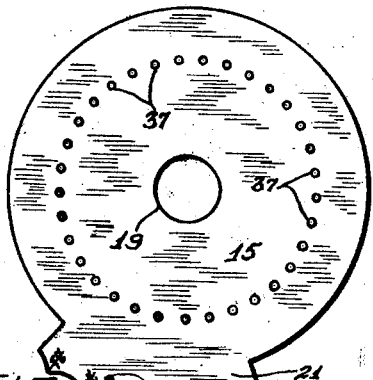
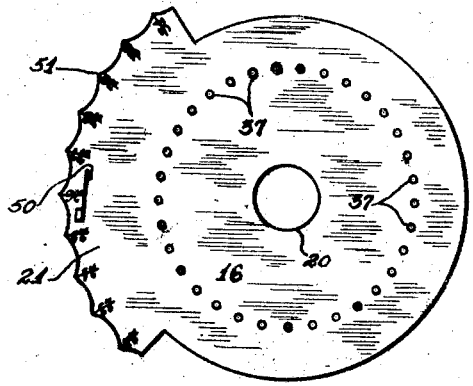
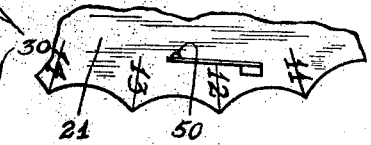
Inventor
CARL E. TURNQUIST.

Patented Feb. 17, 1925.

1,526,399

UNITED STATES PATENT OFFICE.

CARL EARNEST TURNQUIST, OF SAN GABRIEL, CALIFORNIA, ASSIGNOR OF ONE-HALF TO ULYSSES GRANT ORENDORFF, OF CANTON, ILLINOIS.

COMBINED CALENDAR AND CHART.

Application filed January 12, 1923. Serial No. 612,211.

*To all whom it may concern:*

Be it known that I, CARL EARNEST TURNQUIST, a citizen of the United States of America, residing at San Gabriel, in the county of Los Angeles and State of California, have invented certain new and useful Improvements in Combined Calendars and Charts, of which the following is a specification.

The invention relates to an improved combined calendar and chart and is particularly adaptable to use in connection with an incubator for hatching eggs.

While the invention may be employed for many purposes it will be described and illustrated as applied to an incubator for hatching eggs.

In hatching eggs in an incubator there are many things that are necessary to do in the proper operation of the incubator between the date of setting the eggs and the date of hatching, such for example as turning the eggs, drawing the moisture from the incubator, testing the eggs, trimming the wick of the heating lamp, ventilating the incubator, etc.

It is important that these various things be done on certain days after the eggs have been placed in the incubator, and it becomes necessary for the guidance of the operator, and especially so if he be a novice, that he keep a written memorandum of the dates, after setting the eggs, on which these various things must be done, a plan which obviously has its serious disadvantages, such for example as the danger of loss of the memorandum, the entry of wrong dates on the memorandum, and many others.

The primary object of the invention is to provide a combined calendar and chart which will indicate to the operator of the incubator at a glance the date when the eggs were set, the date when they should normally hatch and what things must be done in the proper operation of the incubator and on what dates after the setting of the eggs.

A further object of the invention is to provide a combined calendar and chart for an incubator that will be perpetual in its operation and may be used for an indefinite number of individual hatchings in succession.

A further object of the invention is to provide a combined calendar and chart for incubators upon which a permanent detachable record may be made, the record detached and filed away for future reference.

A further object of the invention is to provide a combined calendar and chart for incubators that will have complete instructions thereon for properly operating an incubator for hatching eggs.

Other objects of the invention will appear from the following description which is directed to the preferred embodiment of the invention, reference being had to the accompanying drawings forming a part thereof, the novel features being more particularly set forth in the appended claims.

The invention will now be described in detail, reference being had to the accompanying drawings in which:

Fig. 1 is a plan view of the improved combined calendar and chart.

Fig. 2 is a sectional view taken on line 2—2 of Fig. 1 looking in the direction of the arrows.

Figs. 3, 4, 5 and 6 are plan views of calendar disks.

Fig. 7 is a plan view of the detachable record card.

Fig. 8 is an enlarged fragmental section of one of the calendar disks showing in detail the spring actuated detent for securing the calendar disks to the master disk.

Like reference characters indicate like parts throughout the drawings.

The improved combined calendar and chart may be made of cardboard or light sheet metal such for example as aluminum, but will be described as made of aluminum.

Reference character 10 indicates the supporting base or back for the device which is provided with means such as aperture 11 for the reception therethrough of a nail or hook for supporting it on the wall of an incubator.

Base 10 has upstruck boss or hub 12 formed therein for the reception thereon of calendar disks 13, 14, 15 and 16 which disks have apertures 17, 18, 19 and 20 in their centers which are adapted to fit over boss or hub 12 permitting rotation of the several disks thereon. It will be noted by reference to Figs. 3, 4, 5 and 6 of the drawing that these disks carry on their peripheral edge an extending sector 21 on which are indicated the days of a calendar month having thirty-one days, each of the disks having indicated thereon only a portion of the 31 days, disk 13 having the days from 1 to 8 both inclusive, disk 14 having the days from 9 to 15 both inclusive, disk 15 having the days from 16 to 21 both inclusive, and disk 16 having the days from 22 to 31 both inclusive, thus the four disks comprising a calendar month of 31 days, which is the longest month in any year. This arrangement of the days of the month on the four disks each having a portion of the 31 days thereon is for the purpose of meeting the exigencies arising from the calendar months having less than 31 days therein in the operation of the device. In assembling the disks 13, 14, 15 and 16 upon hub 12 it will be noted that disk 16 is placed lowermost or next to the base 10 (see Fig. 2), this disk 16 having indicated on the sector 21 the days 22 to 31 of the month. Disk 15 having the days from 16 to 21 both inclusive indicated on the sector 21 thereof is superimposed upon disk 16, while disk 14 having the days 9 to 15 both inclusive indicated on the peripheral sector 21 thereof is superimposed upon disk 15, and disk 13 having the days 1 to 8 both inclusive indicated on the sector 21 thereof is superimposed on disk 14. Surmounting the disks 13, 14, 15 and 16 is master disk 22 which is rigidly affixed in any suitable manner to the face of hub 12. Back or base 10 has opening 25 therein, preferably adjacent the lower end of the back or base through which opening the record card 26 is plainly visible and upon which the record of the setting of eggs may be inscribed during the hatching period, the base or back 10 having printed thereon as in column 27 the index of the information which it is desired to record during the hatching of a setting of eggs. Record card 26 has printed thereon a duplicate of the index 27 in column 29 with lines 30 printed thereon and opposite each item of information of the record for the insertion thereon of such figures as may be necessary for forming the record during the operation of the incubator. For example in Fig. 7 is shown a record card with " Date set ", " Hatched for ", " Number of eggs ", " Out on first test ", " Dead germs ", " Clear eggs ", " Chicks hatched ", " Cripples ", " Chicks delivered ", and " Egg producer ", and on the printed lines 30 is written the record pertaining to the specific date and conditions contained in column 29. When a setting of eggs has been in the incubator for the prescribed term of incubation, the operator may withdraw the record card having the information thereon pertaining to the incubation and file it away for future reference.

Base 10 has guide-ways 31 beneath the lateral edges of opening 25 for the insertion of record card 26 therein and has cut-away portion 32 on one edge thereof in order that the card 26 may be conveniently grasped with the fingers for insertion and withdrawal from the base 10.

Master disk 22 has printed on a sector 33 thereof, comprising approximately one-third of the master disk, certain instructions as at 34 for the proper preparation of the incubator before placing a setting of eggs therein. Sector 33 also has printed thereon the twelve calendar months of the year arranged in an arc of a circle as at 35. Below each of the respective months are perforations 36, the disks 13, 14, 15 and 16 having perforations 37 which are adapted to lie below and register with perforations 36 in the master disk when the calendar disks are set in their operative positions. Below perforations 36 and on master disk 22 are printed instructions as at 38 for setting the calendar. Master disk 22 has radial line 39 with the words "Date set" indicating the day on which the eggs are placed in the incubator and at radial line 40 on the master disk 22 is indicated instructions for the operation of the incubator when the normal length of time for the hatching of a setting of eggs is completed. On master disk 22 and spaced from the peripheral edge thereof as at 41 are figures spaced apart denoting in numerical order the space of 21 days' time which is the length of time normally required for hatching a setting of eggs. Radiating from the center of master disk 22 to the spaced apart figures indicating the 21 days is a series of lines with instructions as to what is necessary for the operator to do on the particular day to which the line leads for the proper operation of the incubator. For example, radial line 42 leading from the center of the master disk to "1st" has the instruction "Thermometer bulb touching top of 2 eggs" and line 43 leading to 6 has instructions, "Open ventilator wide, drain moisture pan"; line 44 has the instruction "Test eggs"; the instructions with line 42 indicating what is to be done by the operator on the 1st day after setting the eggs; the instructions with line 43 indicating to the operator what is to be done on the 6th day after setting the eggs; and instructions with line 44 indicating to the operator what is to be done on the 14th day after setting the eggs; and so on. Intermediate the periphery of the master disk and the days from 1st to 21 and in alignment therewith is indicated the temperature at which the incubator should be kept on the specific day in alignment with the temperature indicated.

Pointer 45 is pivotally related to bolt 23 which is screw threaded at its outer end for screw threaded engagement therewith of nut 24 and carries at the outer radially extending portion thereof leaf spring 46 to the outer end of which is secured pin 47 which is adapted to pass through apertures 36 of master disk 22 and apertures 37 of calendar disks 13, 14, 15 and 16, thereby locking the calendar disks 13, 14, 15 and 16 against rotation with relation to master disk 22. On the rear face of the back or base 10 are guideways 48 for the insertion therein of a calendar 49ª for convenient reference by the operator. Master disk 22 has spaced apart indents or notches 49 around the peripheral edge thereof and calendar disks 13, 14, 15 and 16 are each provided with a spring actuated detent 50 which is adapted to engage in the indents 49 of master disk 22 to prevent accidental rotation of the calendar disks when setting the device. On the calendar disks and in alignment with the days of the month indicated thereon are guide lines 51 which are adapted to be brought into registration with radial line 39 of the master disk when setting the device.

The operation of my improved combined calendar and chart is as follows:—

It being assumed that a setting of eggs is placed in the incubator on the 7th day of June as indicated in Fig. 1, the pointer 45 is removed from engagement with perforations 36 of master disk 22 and perforations 37 of calendar disks 13, 14, 15 and 16, calendar disk 13 is rotated on the hub 12 until the figure 7 registers with line 39 when disk 14 is turned on hub 12 so that the angular face of sector 21 thereof is brought in alignment with the angular face of sector 21 of disk 13 which will bring the figure 9 designating the 9th day of the month next in succession to the figure 8 designating the 8th day of the month on sector 21 of calendar disk 13 when calendar disk 15 is rotated on hub 12 until the angular face of sector 21 is brought into alignment with the angular face of sector 21 of disk 14 adjacent the figure 15 thereon indicating the 15th day of the month, when disk 16 is rotated on hub 12 until the angular face of sector 21 adjacent the figure 22 indicating the 22nd day of the month is brought into alignment with the angular face of the sector 21 of calendar disk 15 adjacent figure 21 indicating the 21st day of the month. It will be found that when the disks are so manipulated that the days of the month displayed on the sectors thereof will run consecutively from 1 to 31, it being understood that as these disks are moved into their proper positions the detents 50 will engage in the notches 49 thus securing the calendar disks against accidental rotation. The pointer 45 is then moved to indicate the month of June and the pin 47 inserted through master disk 22 and calendar disks 16, 15, 14 and 13, thereby locking the several parts against rotation.

Should the calendar be set for any given day in a month having less than 31 days, say for the 10th day of a February having 28 days, disk 14 would be rotated on hub 12 until the figure 10 on the sector thereof would be opposite radial line 39 and the disks 15 and 16 rotated with relation to disk 14 as previously explained when disk 13 would be rotated on hub 12 until the sector 21 thereof overlaps the sector 21 of calendar disk 16 until the figure 1 indicating the 1st day of the month on sector 21 of disk 13 would lie immediately over the figure 29 on the sector 21 of disk 16, thereby indicating the 1st day of March which succeeds February, as immediately succeeding the 28th day of February.

It will be readily seen that my improved combined calendar and chart provides a unique calendar and chart for determining at a glance the day or time when a hatching of eggs is placed in the incubator and the day or time when they should normally be hatched and indicating just what should be done by the operator on specific days between the time of setting the eggs and the time when they should normally hatch.

Having thus described my invention, what I claim is:

1. A combined calendar and chart comprising a base, a plurality of co-operating calendar disks rotatably related to the base, and a master disk, the calendar disks having the days of a month indicated thereon, the master disk having a period of time indicated thereon, the period of time being subdivided into days and progressively indicated, the days indicated on the calendar disks being adapted to be brought into registration with the days indicated on the master disk.

2. A combined calendar and chart comprising a base, a plurality of co-operating calendar disks rotatably related to the base, a master disk non-rotatably related to the base, the calendar disks having the days of a month indicated thereon, the master disk having a period of time indicated thereon, the period of time being subdivided into days and progressively indicated, the days indicated on the calendar disks being adapted to be brought into registration with the days indicated on the master disk.

3. A combined calendar and chart comprising a base, a plurality of co-operating calendar disks rotatably related to the base, a master disk non-rotatably related to the base, the calendar disks having the days of a month indicated thereon, the master disk having a period of time indicated thereon, the period of time being subdivided into days and progressively indicated, the days indicated on the calendar disks being adapted to be brought into registration with the days indicated on the master disk, the master disk having the months of the year indicated thereon and arranged in the arc of a circle, a pointer pivotally related to the master disk and adapted to be brought into registration with either of the months so indicated.

4. A combined calendar and chart comprising a base, a plurality of co-operating calendar disks rotatably related to the base, a master disk non-rotatably related to the base, the calendar disks having the days of a month indicated thereon, the master disk having a period of time indicated thereon, the period of time being sub-divided into days and progressively indicated, the days indicated on the calendar disks being adapted to be brought into registration with the days indicated on the master disk, the master disk having the months of the year indicated thereon and arranged in the arc of a circle, a pointer pivotally related to the master disk and adapted to be brought into registration with either of the months so indicated, there being spaced apart perforations through the master disk and adjacent the months as indicated thereon and the calendar disks having perforations therethrough and adapted to register with perforations in the master disk, and a pin carried by the pointer and adapted to pass through the perforations in the master disk and the perforations in the calendar disks whereby to lock the calendar disks against rotation with relation to the master disk.

5. A combined calendar and chart comprising a base, a plurality of co-operating calendar disks rotatably related to the base, a master disk non-rotatably related to the base, the calendar disks having the days of the month indicated thereon, the master disk having a period of time indicated thereon, the period of time being subdivided into days and progressively indicated, the days indicated on the calendar disks being adapted to be brought into registration with the days indicated on the master disk, the master disk having the months of the year indicated thereon and arranged in the arc of a circle, a pointer pivotally related to the master disk and adapted to be brought into registration with either of the months so indicated, there being spaced apart perforations through the master disk and adjacent the months as indicated thereon and the calendar disks having perforations therethrough and adapted to register with perforations through the master disk, and a spring actuated pin carried by the pointer and adapted to pass through the perforations in the master disk and the perforations in the calendar disks whereby to lock the calendar disks against rotation with relation to the master disk.

6. A combined calendar and chart comprising a base, a plurality of co-operating calendar disks rotatably related to the base, a master disk, each calendar disk having a number of consecutive days forming a portion of a month indicated thereon, the master disk having a period of time indicated thereon, the period of time being sub-divided into days and progressively indicated, the days indicated on the calendar disks being adapted to be brought into registration with the days indicated on the master disk, radial lines on the master disk coinciding with the days indicated thereon, and instructions for the proper operation of an incubator associated with the lines.

7. A combined calendar and chart comprising a base, a plurality of co-operating calendar disks rotatably related to the base, a master disk superimposed above the calendar disks and of less diameter than the calendar disks, the calendar disks having the days of a month indicated thereon, the master disk having a period of time indicated thereon, the period of time being subdivided into days and progressively indicated, the days indicated on the calendar disks being adapted to be brought into registration with the days indicated on the master disk, the master disk having a plurality of indents in the periphery thereof and detents carried by each of the calendar disks adapted to engage in the indents in the periphery of the master disk.

8. A combined calendar and chart comprising a base, a plurality of co-operating calendar disks rotatably related to the base, a master disk superimposed above the calendar disks and of less diameter than the calendar disks, the calendar disks having the days of the month indicated thereon, the master disk having a period of time indicated thereon, the period of time being sub-divided into days and progressively indicated, the days indicated on the calendar disks being adapted to be brought into registration with the days indicated on the master disk, the master disk having a plurality of indents in the periphery thereof and spring actuated detents carried by each of the calendar disks adapted to engage in the indents in the periphery of the master disk.

9. A combined calendar and chart comprising a base, a plurality of co-operating calendar disks rotatably related to the base, a master disk, the calendar disks having the days of a month indicated thereon, the master disk having a period of time indicated thereon, the period of time being subdivided into days and progressively indicated, the days indicated on the calendar disks being adapted to be brought into registration with the days indicated on the master disk, radial lines on the master disk coinciding with the days indicated thereon, instructions for the proper operation of an incubator associated with the lines, instructions on the master disk for the proper preparation of an incubator for placing a setting of eggs therein for incubation, a detachable record card supported by the base, an opening in the base and means for securing the record card to the base and beneath the opening.

10. A combined calendar and chart comprising a base, a plurality of co-operating calendar disks rotatably related to the base, a master disk, the calendar disks having the days of a month indicated thereon, the master disk having a period of time indicated thereon, the period of time being subdivided into days and progressively indicated, the days indicated on the calendar disks being adapted to be brought into registration with the days indicated on the master disk, radial lines on the master disk coinciding with the days indicated thereon, instructions for the proper operation of an incubator associated with the lines, instructions on the master disk for the proper preparation of an incubator for placing a setting of eggs therein for incubation, a detachable record card supported by the base, an opening in the base, means for securing the record card to the base and beneath the opening, record indicia printed on the base and adjacent one end of the opening, the record card having a replica of the information indicia printed thereon and adjacent one end thereof and adapted to lie directly below the information indicia printed on the base when the card is inserted in the securing means.

11. A combined calendar and chart for an incubator comprising a base, a plurality of co-operating calendar disks rotatably related to the base, a master disk nonrotatably related to the base, the calendar disks having the days of a month indicated thereon and each calendar disk carrying a progressively arranged number of days of a portion of a month, the master disk having a period of time indicated thereon, the period of time being subdivided into days and progressively indicated, the days indicated on the calendar disks being adapted to be brought into registration with the days indicated on the master disk.

12. In a combined calendar and chart the combination of a base having a boss thereon, a plurality of co-operating calendar disks rotatably mounted on the boss, a master disk affixed to the face of the boss, the calendar disks having extending sectors on the peripheries thereof, the days of a thirty-one day month being indicated on the sectors and adapted to be arranged consecutively when the calendar disks are in operative relation, the master disk having a period of time indicated thereon in days and adjacent the periphery thereof, degrees of temperature indicated on the master disk intermediate the periphery of the disk and the figures indicating the days, instructions on the master disk for operating an incubator, the calendar months being indicated on the master disk, a pointer pivotally related to the master disk and adapted to be moved into alignment with either of the calendar months, a pin carried by the pointer, and the master disk and the calendar disks having perforations therethrough for the insertion therein of the pin for locking the calendar disks against rotation with the master disk.

13. In a combined calendar and chart the combination of a base having a hub thereon with a plurality of co-operating calendar disks rotatably mounted on the hub, a master disk affixed to the face of the hub, the calendar disks having extending sectors on the peripheries thereof, the days of a thirty-one day month being indicated on the sectors, a portion of the thirty-one days being indicated on each sector, so that when the disks are arranged in operative relation the thirty-one days are consecutively arranged, the master disk having a period of time indicated in days adjacent the periphery thereof, degrees of temperature indicated on the master disk and intermediate the periphery of the disk and the figures indicating the days, instructions on the master disk for operating an incubator, the calendar months being indicated on the master disk, a pointer pivotally related to the master disk and adapted to be moved into alignment with either of the calendar months, the master disk and the calendar disks having perforations therethrough, and a pin carried by the pointer and adapted to be inserted through the perforations for locking the calendar disks against rotation with relation to the master disk.

In testimony whereof I have signed my name to this specification, in the presence of a subscribing witness, on this 5th day of January, A. D. 1923.

CARL EARNEST TURNQUIST.

Witness:
ESTHER H. TEABON.